(12) United States Patent  
Swiatek et al.

(10) Patent No.: US 7,033,209 B2
(45) Date of Patent: Apr. 25, 2006

(54) VEHICLE ACCESSORY POWER CONNECTOR

(76) Inventors: John A. Swiatek, 46208 Meadowview Dr., Utica, MI (US) 48317; Ronald D. Cowles, 4047 Bacon Ave., Berkley, MI (US) 48072

( * ) Notice: Subject to any disclaimer, the term of this patent is extended or adjusted under 35 U.S.C. 154(b) by 0 days.

(21) Appl. No.: 10/498,705

(22) PCT Filed: Jan. 6, 2003

(86) PCT No.: PCT/US03/00318

§ 371 (c)(1),
(2), (4) Date: Jun. 14, 2004

(87) PCT Pub. No.: WO03/058763

PCT Pub. Date: Jul. 17, 2003

(65) Prior Publication Data

US 2005/0014408 A1 Jan. 20, 2005

Related U.S. Application Data

(60) Provisional application No. 60/403,697, filed on Aug. 15, 2002, provisional application No. 60/367,405, filed on Mar. 25, 2002, provisional application No. 60/345,023, filed on Jan. 4, 2002.

(51) Int. Cl.
*H01R 11/00* (2006.01)
(52) U.S. Cl. ................................ 439/502
(58) Field of Classification Search ............. 439/502, 439/504, 505, 34, 668, 35, 284
See application file for complete search history.

(56) References Cited

U.S. PATENT DOCUMENTS

| 4,261,634 | A | * | 4/1981 | Robinson | 439/668 |
| 4,647,139 | A |   | 3/1987 | Yang |  |
| 4,822,293 | A | * | 4/1989 | Robson | 439/271 |
| 4,936,796 | A | * | 6/1990 | Anderson, Jr. | 439/620 |
| 4,981,243 | A | * | 1/1991 | Rogowski | 224/431 |
| 5,961,207 | A |   | 10/1999 | Petkovic |  |
| 6,459,233 | B1 | * | 10/2002 | Liang | 320/105 |
| 6,619,983 | B1 | * | 9/2003 | Ota et al. | 439/558 |

\* cited by examiner

*Primary Examiner*—Ross Gushi
(74) *Attorney, Agent, or Firm*—Cargill & Associates, PLLC

(57) ABSTRACT

Power connectors and power adapters for various vehicles including motorcycles, snowmobiles, golf carts, and other off-road vehicles to provide easy access to an electrical system on the vehicle to plug in various accessories, including cell phones, laptop computers, audio systems, communications systems, and the like. Connecting wires with power connectors include various standard-size connectors, including DIN 4165 connectors, SAE two-pin connectors, and cigarette lighter sockets, for example. Specific mounting brackets are disclosed to be utilized in locations on various motorcycles and other off-road vehicles for easy access to the power outlet socket attached to the mounting bracket. Further, various adapter wiring harnesses for changing from one type of connector to another are disclosed, as well as a piece of luggage for carrying all of the accessories, and the luggage piece incorporates a power outlet in the side of the luggage bag. Many embodiments of the above are also disclosed.

4 Claims, 16 Drawing Sheets

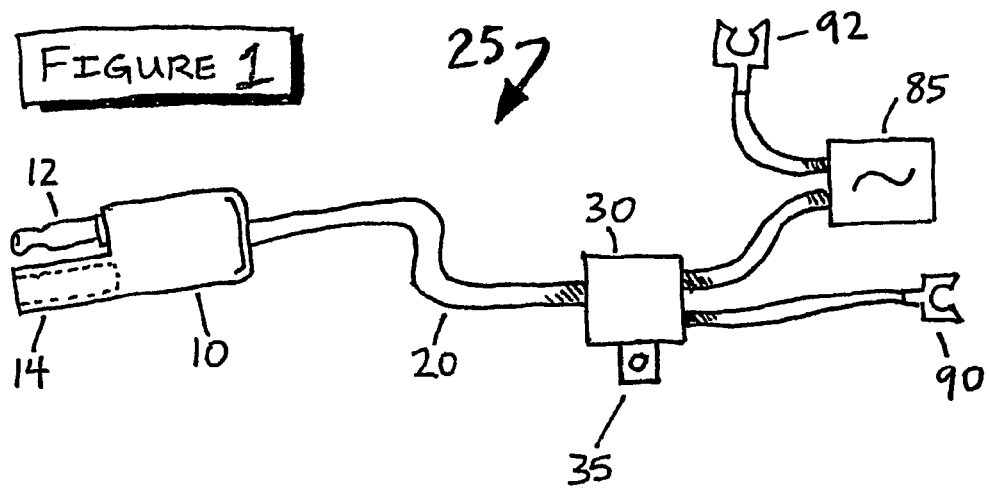
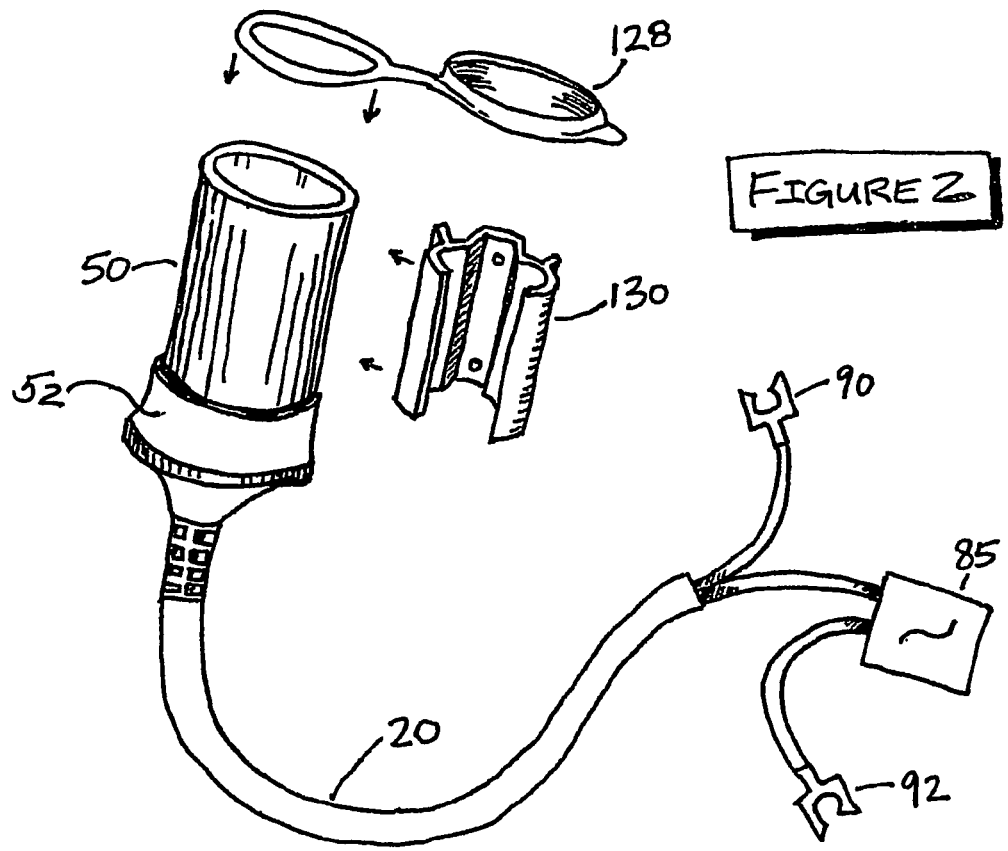

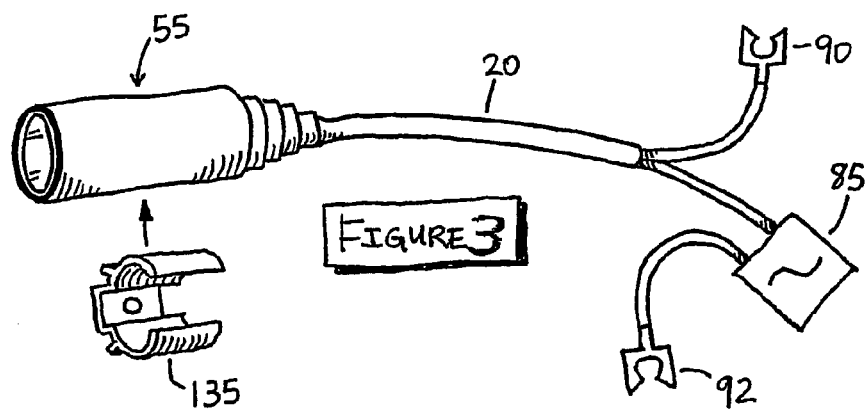
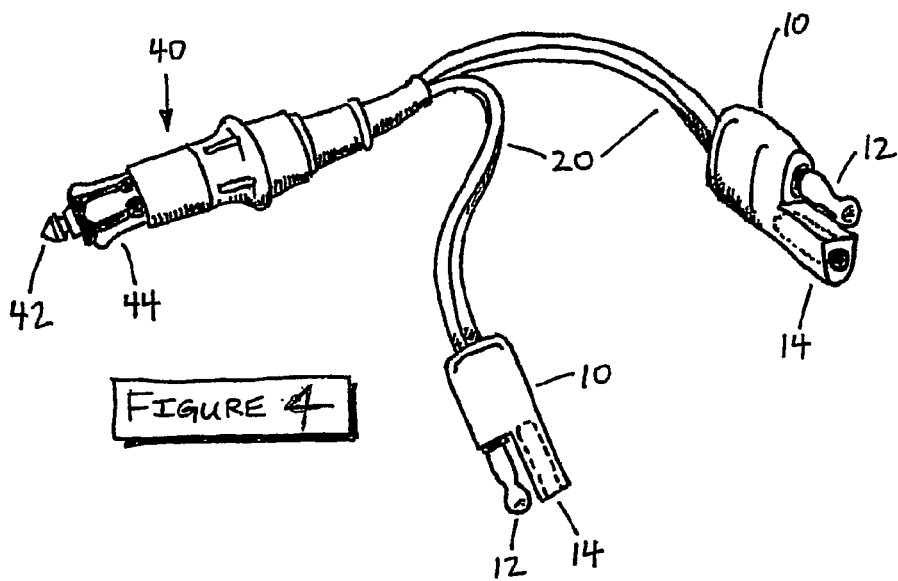
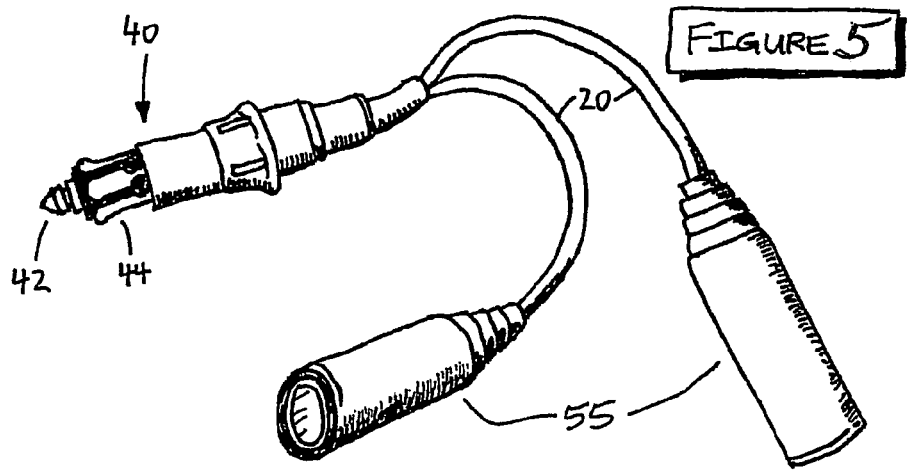

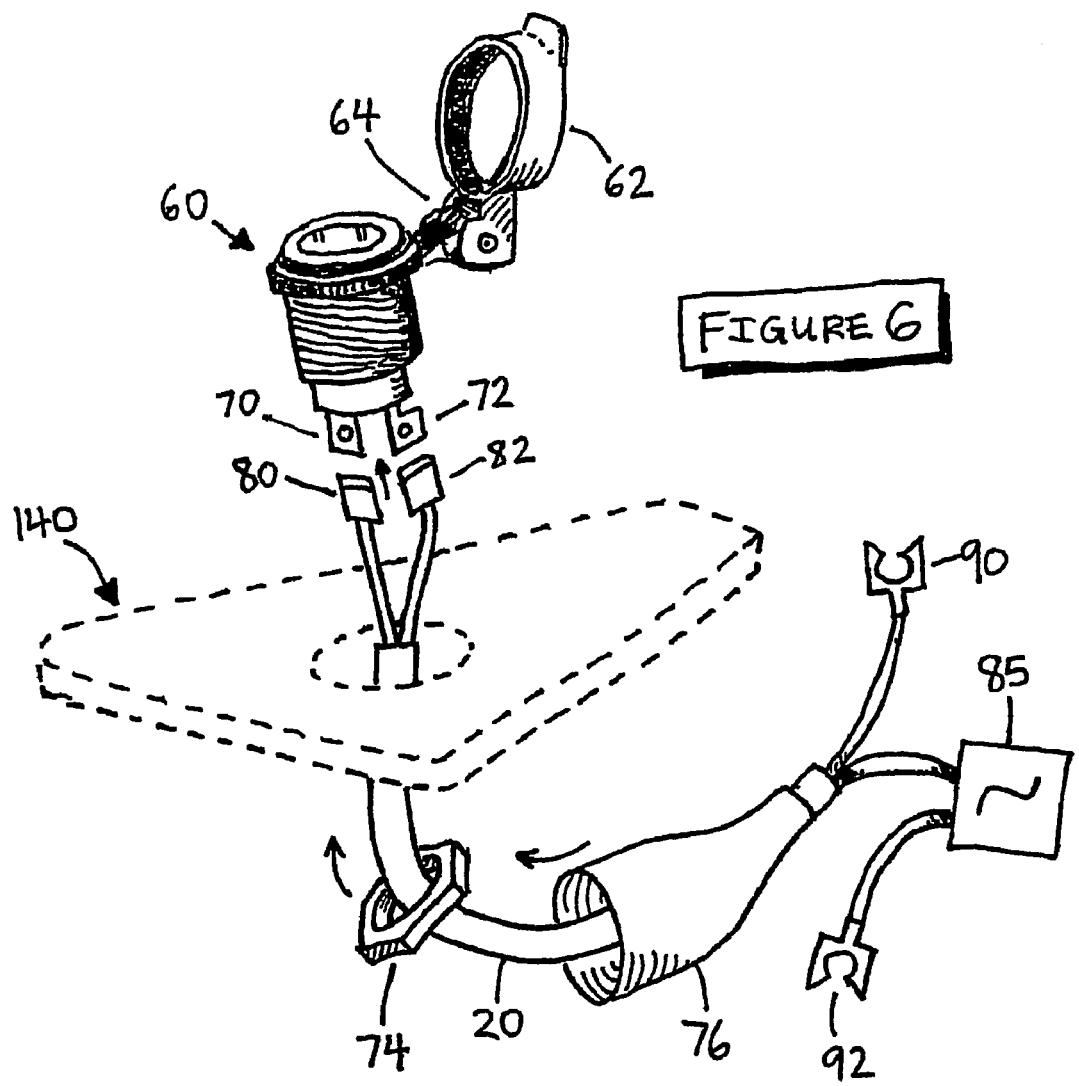

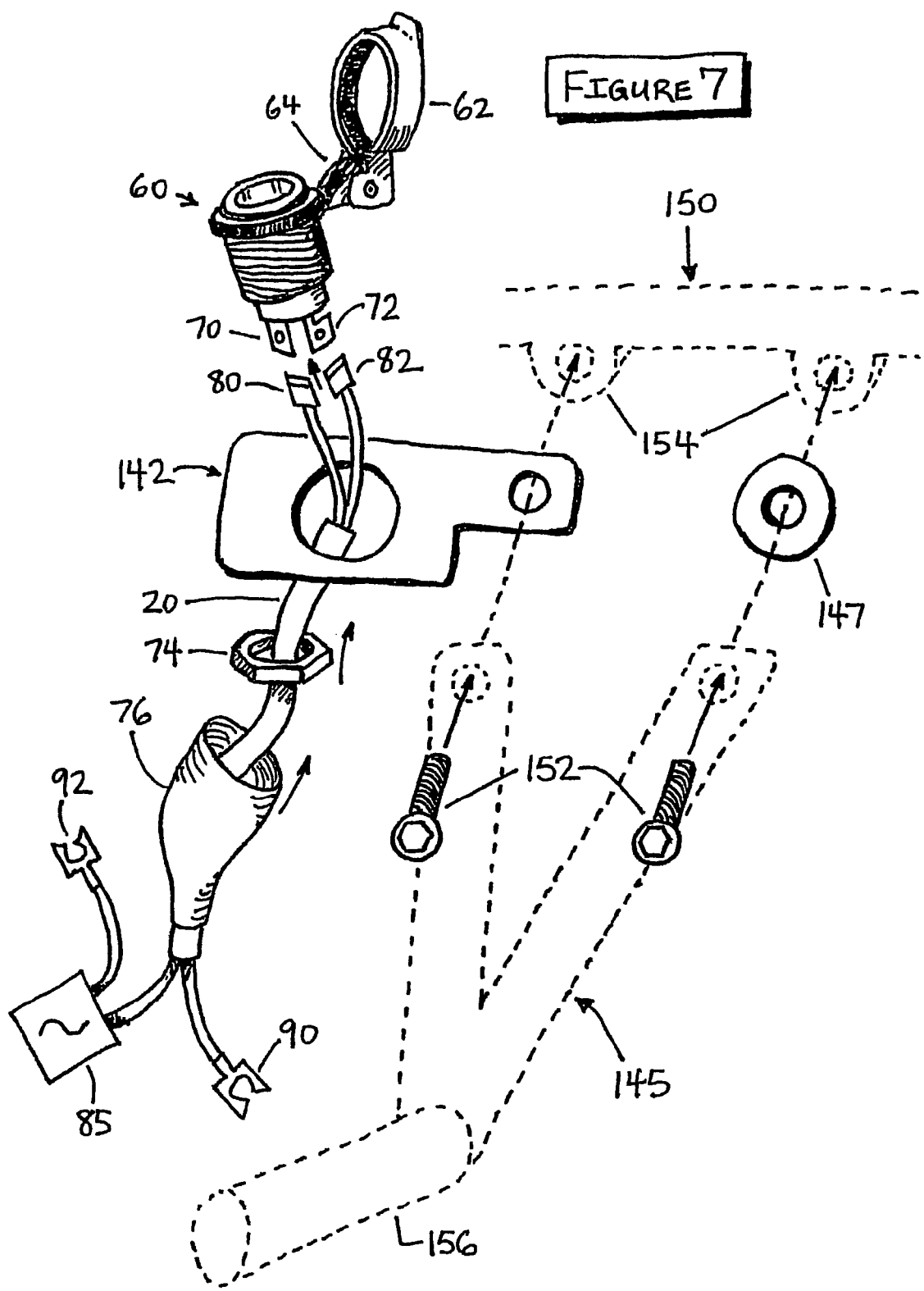

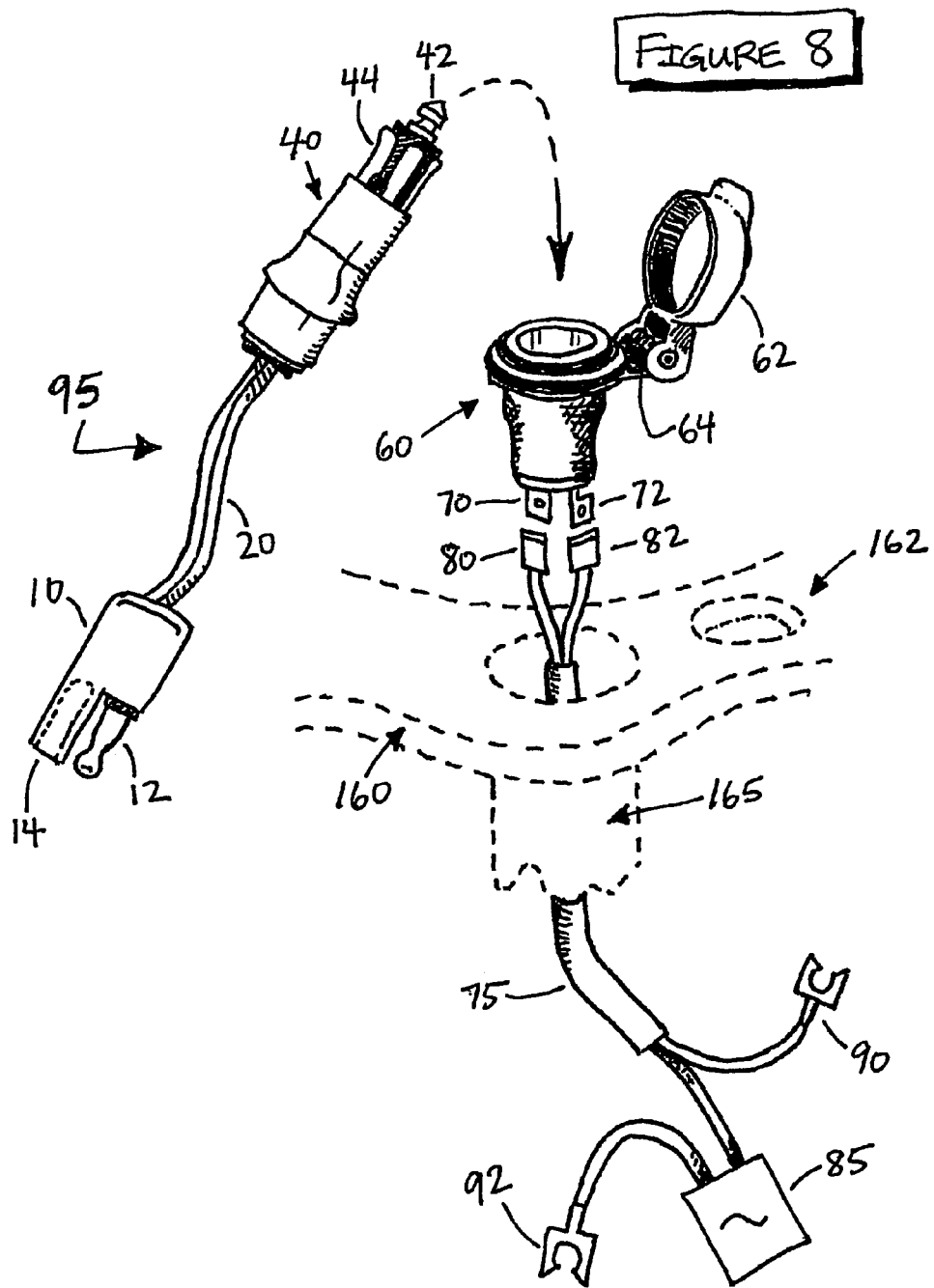

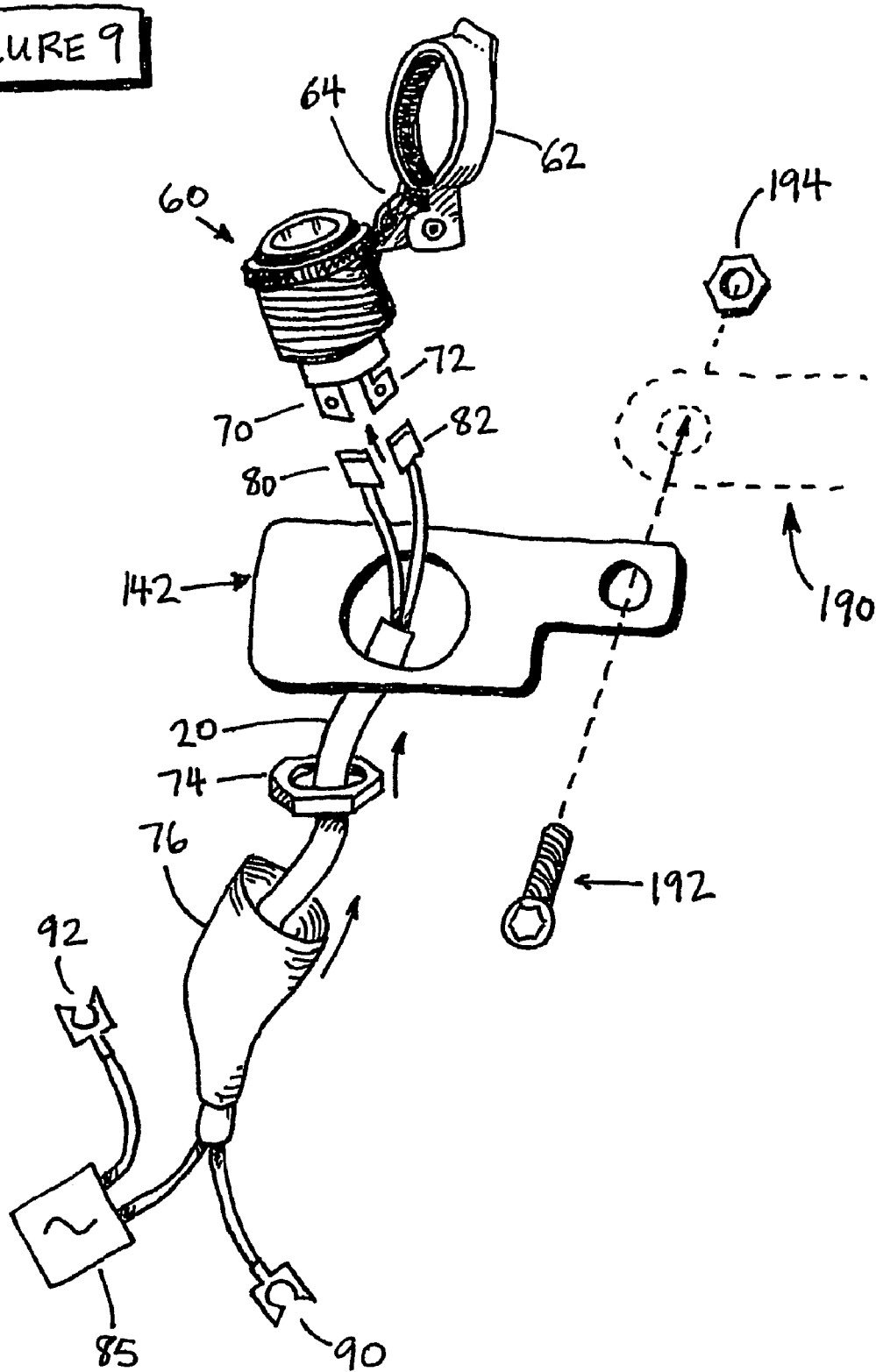

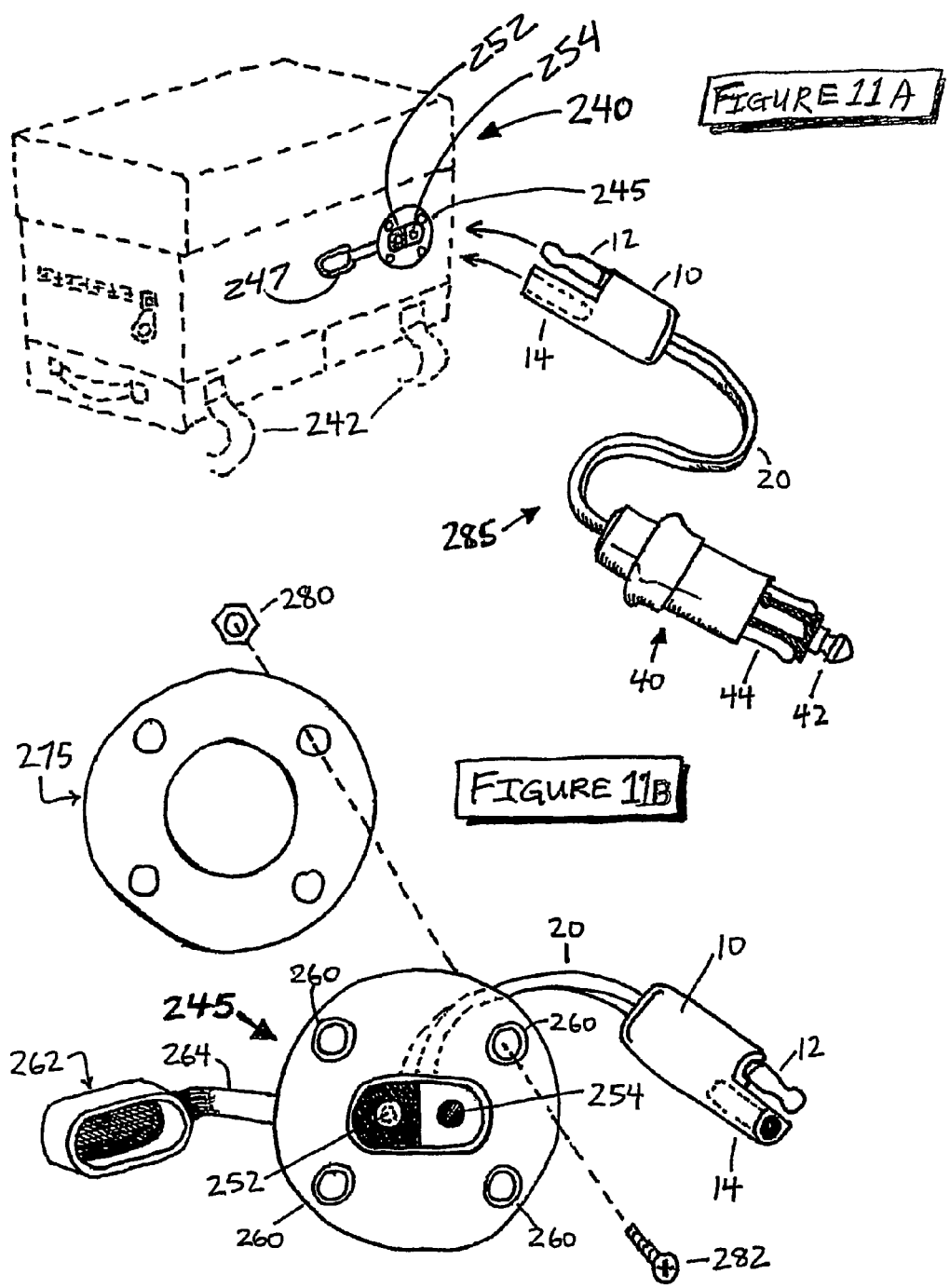

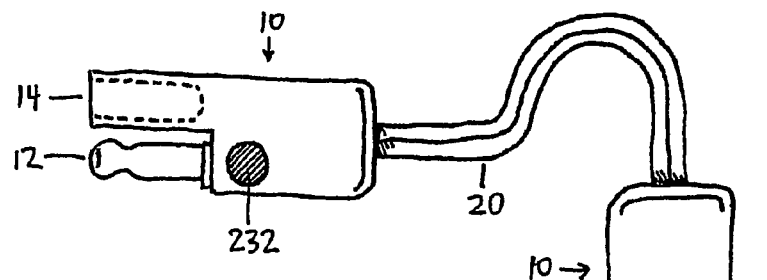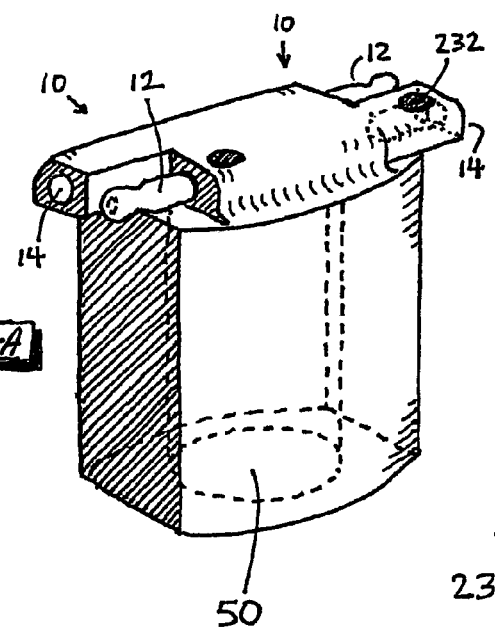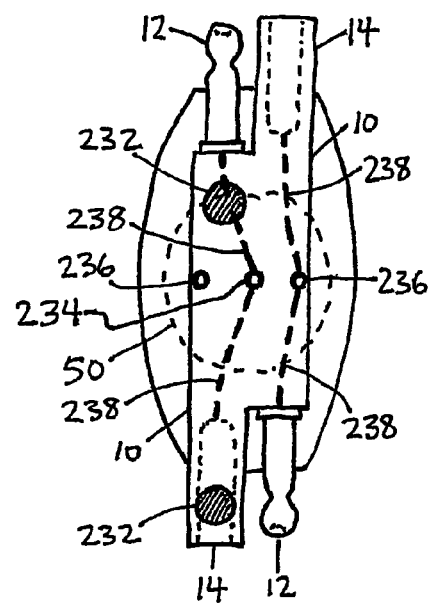

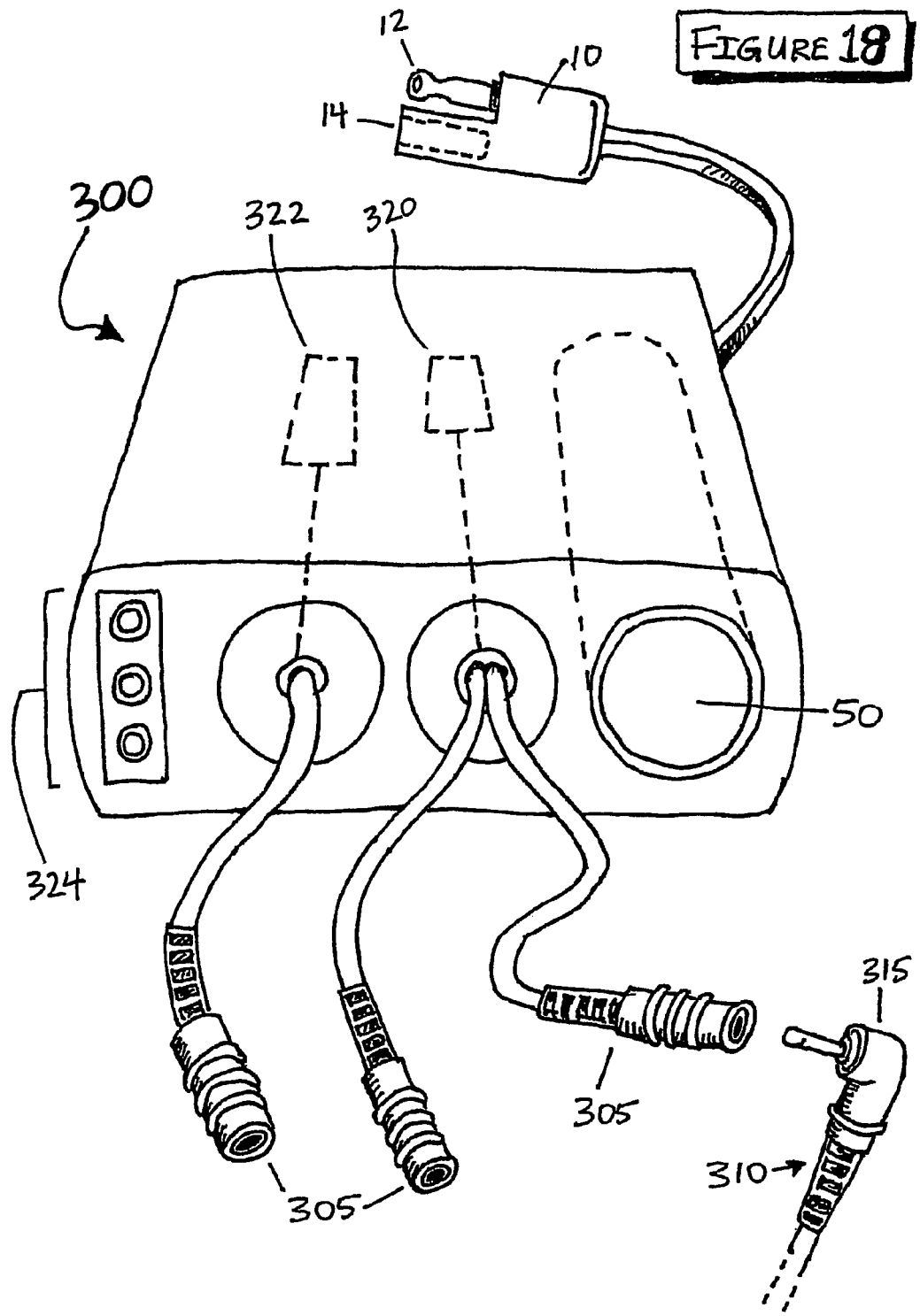

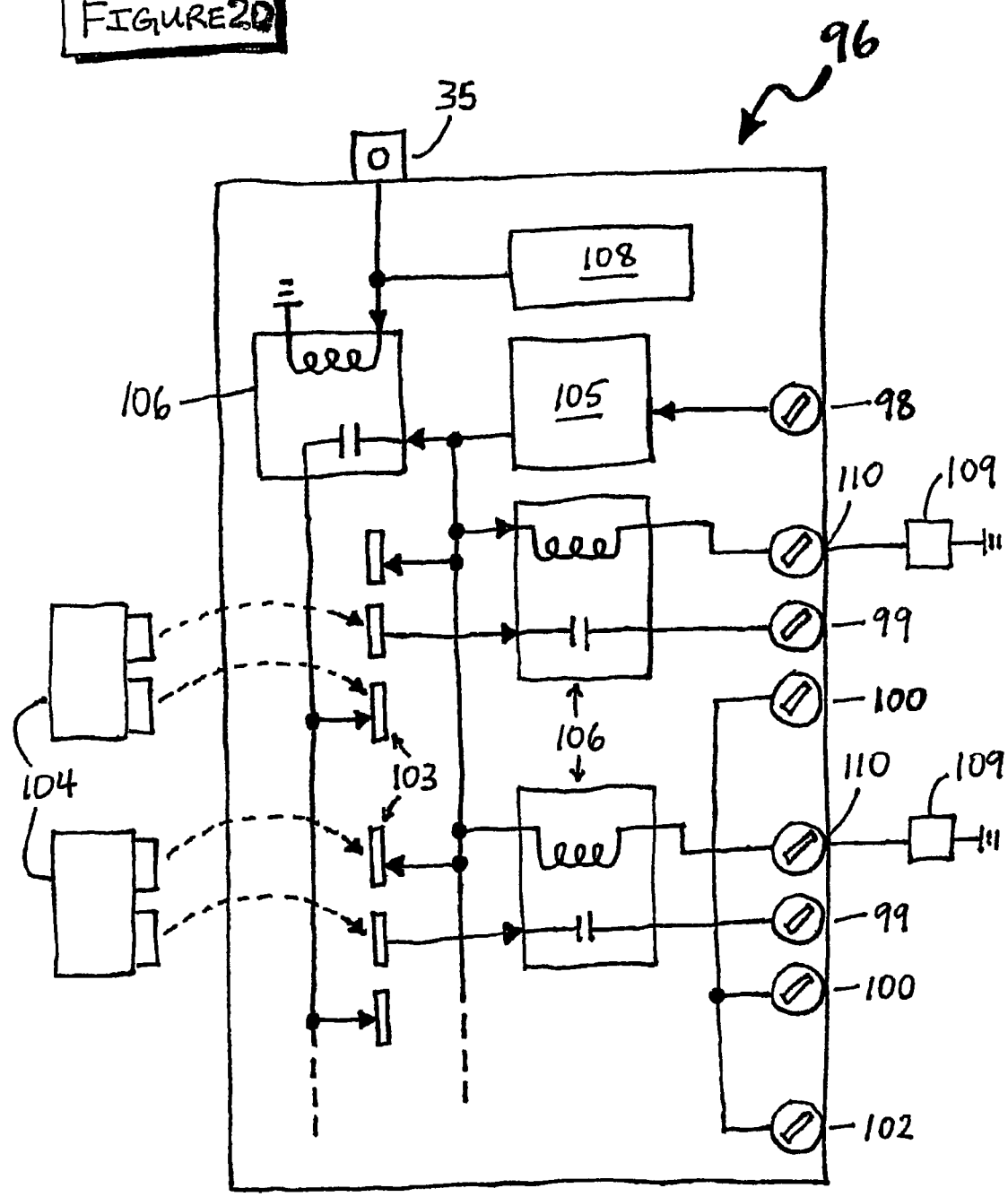

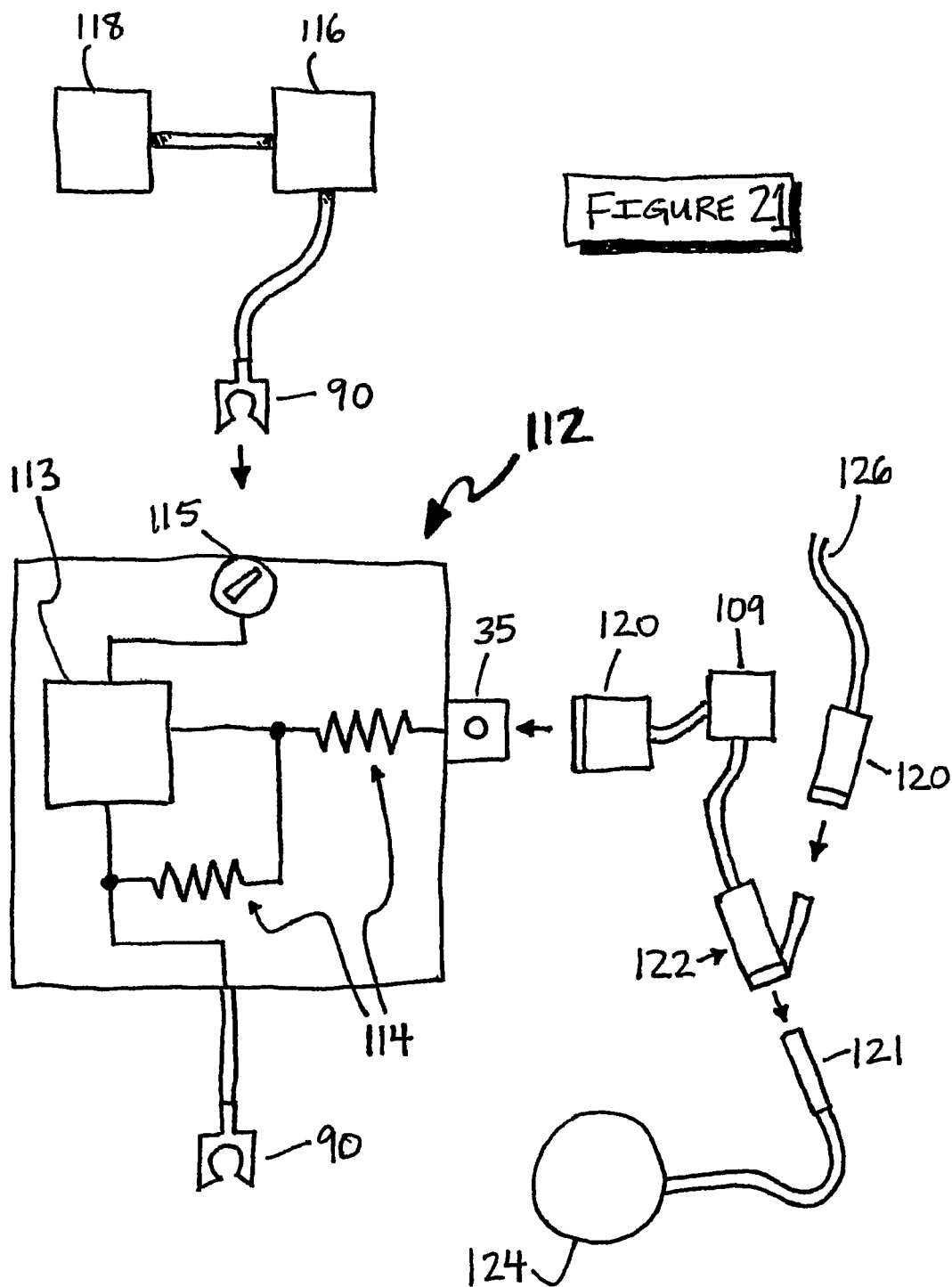

VEHICLE ACCESSORY POWER CONNECTOR

CROSS REFERENCES TO RELATED APPLICATIONS

This application claims the benefit of U.S. Provisional Application No. 60/345,023 filed on Jan. 4, 2002; U.S. Provisional Application No. 60/367,405 filed on Mar. 25, 2002; and U.S. Provisional Application No. 60/403,697 filed on Aug. 15, 2002, all of which are incorporated herein by reference.

TECHNICAL FIELD

This invention relates to electrical connectors adapted to be installed on vehicles, and more particularly to electrical connectors, mounting brackets and electrically connectable accessory carrying cases that allow for electrical connections between electrically powered accessories and appliances and the power supply on vehicles including motorcycles, snowmobiles, wheelchairs, hi-lo's, construction equipment, personal watercraft, boats, among others.

BACKGROUND OF THE INVENTION

Portable powered accessories have become very popular in the current economy. These portable powered accessories include things such as cell phones, personal audio/CD/MP3 stereo systems, radar detectors, laptop computers, and any number of other portable accessories. As more and more people acquire these accessories, they have desires to become more and more mobile and they would like to be able to work when they are out on their off-road vehicles, including motorcycles, snowmobiles, boats, or any other vehicle. For instance, 20 years ago real estate executives would have to stay in their office in order to make a living. Now, however, such professionals can go on the road on their motorcycle and still make a living. Manufacturer's representatives and salesmen are able to close deals while out on their boat or out on the road.

However, there is a logistical problem with using all of these appliances and accessories in that there are no quick and easy electrical connections to the battery or motor of the vehicle that they are operating. In four-wheel drive SUV automobiles, there are now option packages which make cigarette sockets in multiple configurations possible. However, for any other type of vehicle, the person using the cell phone or the other appliance is left to their own devices in order to find a way to recharge the batteries of their accessories and/or use it on the off-road vehicle. For instance, large, land cruising motorcycles can be ridden for weeks on end for long trips cross country, and it would be advantageous for the rider to have access to his cell phone, his laptop computer or his personal audio/stereo system. Motorcyclists, snowmobile riders or personal watercraft drivers are generally required to either wholly or partially disassemble the top half of their vehicles in order to gain access to the battery terminals for power charging any of their accessories. That creates a large problem for the enthusiast that has all the "toys" he wants to use, but can't use them while he is riding.

Therefore, it would be an advantage to a motorcyclist, snowmobiler, boater or any other off-road vehicle enthusiast to have at his disposal a series of various electrical sockets, accessory outlets and the like for plugging in all of his appliances and accessories. It would also be advantageous to have standard sized outlets, sockets and plugs such that connectors may be used for a host of appliances and accessories.

As one can imagine, there is a relatively small selection of standard sized sockets and adapters which can be utilized for most of the low volt or 12 volt appliances and accessories desirable by these off-road enthusiasts. For example, conventional heated vests for motorcyclists are plugged into a power source with a standard SAE two-pin connector. In the past, the way that motorcycle enthusiasts would plug in their heater vests would be to utilize a connector called a "Battery Tender", registered trademark to the Battery Tender Corporation of Los Angeles, Calif. which is attached to the battery terminals once, and allows a complementary SAE two-pin connector plug to hang from the outside of the motorcycle. However, when this SAE connector is not in use, it flaps in the wind and can chip away at the expensive paint job on the gas tank of the motorcycle. It is envisioned by the present inventors that it would be most advantageous to have a well-secured mounted bracket for holding a standard-sized electrical socket which is then in electrical communication with the power system of the motorcycle. Once installed, the socket may be easily accessed by the motorcyclist and anything that can be adapted to that connector may be plugged in for use, such as a heat source for the plug-in vest, an electrical source to recharge a cell phone, an electrical source for a laptop computer, or as a receiving socket to be used for hooking up a battery charger during the winter to charge the battery.

More and more off-road vehicle enthusiasts are utilizing navigational equipment, including global positioning system units, VHF radios and are also using wireless communication systems between riders on separate vehicles, which can be very important. Further, motorcyclists and snowmobilers have wireless communication systems to be utilized between the driver and the passenger, as well as the driver of one motorcycle to the driver or passenger of another motorcycle, or other off-road vehicle.

When considering all the multitude of low voltage items that can be purchased, there is a multitude of interconnecting wire which may be utilized. It would be an advantage to an off-road vehicle enthusiast to have at his or her disposal a series of various electrical sockets, accessory outlets, and adapters for plugging in all of his or her appliances and accessories. It would also be advantageous to have standard-sized sockets such that the plug-in connectors may be used for a host of low voltage appliances and accessories.

And finally, it would be advantageous to have a vehicle accessory bag, especially in the configuration of a tank bag, which is an accessory carrying case having a power distribution socket and/or connector located in the side of the bag for housing the many different accessories and also for giving a quick and convenient place to plug them in for recharging or operation. As one can imagine, the conventional automotive connector is a cigarette lighter socket into which many automotive related appliances can be plugged. However, for off-road vehicles, the necessary connectors do not always plug into a cigarette lighter socket. Therefore, it is an object of the present invention to provide a multitude of connections, sockets and means for electrically connecting various accessories with suitable electrical sources. This may mean the use of various European, Japanese and American connectors, considering that many motorcycles and off-road vehicle are made in Europe and in Japan. Such standard connectors may include a two-pin SAE connector, a DIN 4165 plug, a standard cigarette lighter socket, a standard female audio input socket, or other commonly needed sockets and connectors.

It is yet another object of the present invention to provide mounting brackets for holding the above-mentioned standard-sized connectors in places which are convenient for plugging in accessories, without having to disassemble the off-road vehicle. Further objects and advantages will be noted in the application as follows.

SUMMARY OF THE INVENTION

In accordance with the above-described objects and advantages of the present invention, there is provided numerous embodiments of the present invention which include basically four different aspects of the present invention. First, there is described a series of sockets attached to wires which are terminated by connectors for connecting directly to the battery terminal or power system of the off-road vehicle. Secondly, the present invention describes various socket and wire combinations in further combination with various mounting brackets for making the socket easily accessible from the outside of the off-road vehicle. Thirdly, a carrying case or piece of luggage adapted for being carried on top of the off-road vehicle includes various sockets incorporated into the sides of the luggage piece for easy carrying and plugging in of the various accessories. The fourth aspect of the present invention includes various adapters for converting one type of connector to another so that any of the sockets may be utilized with most of the accessories and appliances. Finally, remnant appliances are disclosed which may be powered by the above electrical sources.

The present invention provides sockets and connectors, combinations of them with mounting brackets and in pieces of luggage, as well as other appliances, all designed to make plugging in one's accessories easy. Convenient locations for use are now available, as well as making the connections safe, simple and preferably fused. Power can be provided to low voltage (12 volt) electronic appliances, or to charge the vehicle battery from an external battery charger. Installation is simple, and the mountings are designed to fit onto existing brackets and parts, such as the triple tree mounting unit, or the Harley Davidson horn bracket fit. The vehicle does not need to be permanently modified from its original condition in order to install the sockets, as there is no need to drill holes in the vehicle, nor to modify the OEM wiring. The invention has a clean appearance and is visually pleasing while providing the necessary power for accessories, up to 24 volts of current at 12 volts, to power almost any accessory known.

BRIEF DESCRIPTION OF THE DRAWINGS

FIG. 1 shows one of the base embodiments, including a wire having terminals with an SAE two-pin connected thereto;

FIG. 2 shows a wire with connectors having attached thereto a cigarette lighter socket;

FIG. 3 shows a wire with connectors attached to a DIN 4165 plug;

FIG. 4 shows yet another embodiment incorporating a DIN 4165 plug attached to two SAE two-pin connectors;

FIG. 5 illustrates a DIN 4165 plug attached to two DIN 4165 sockets;

FIG. 6 is a view of a DIN 4165 socket embedded into a mounting bracket with a wire connector to be connected to the power system of the vehicle;

FIG. 7 illustrates yet another embodiment of a mounting bracket to attach a DIN 4165 socket to the battery;

FIG. 8 illustrates a DIN 4165 socket connected through the triple tree of a motorcycle handlebar and receiving a cable mount SAE connector adapter;

FIG. 9 illustrates a combination wiring harness and socket in a mounting bracket;

FIG. 11A illustrates a motorcycle luggage tank bag with the power socket shown directly in the side of the bag;

FIG. 11B is a close-up front elevation view of the mounting bracket used in conjunction with the tank bag of FIG. 11A;

FIG. 16 shows a power adapter having SAE connectors cable mounted to one another;

FIG. 17A illustrates yet another embodiment of the present invention in which two SAE connectors are mounted atop a cigarette lighter socket for power adaption;

FIG. 17B shows the top plan view of FIG. 17A, with the wire connector shown in phantom;

FIG. 18 is yet another embodiment of the present invention which includes a power distribution module;

FIG. 20 illustrates the electrical schematic of a battery power distribution module in accordance with the present invention;

FIG. 21 illustrates a schematic and wiring components for a smart ground switch in accordance with the present invention;

DETAILED DESCRIPTION OF THE INVENTION

Figure 10A:
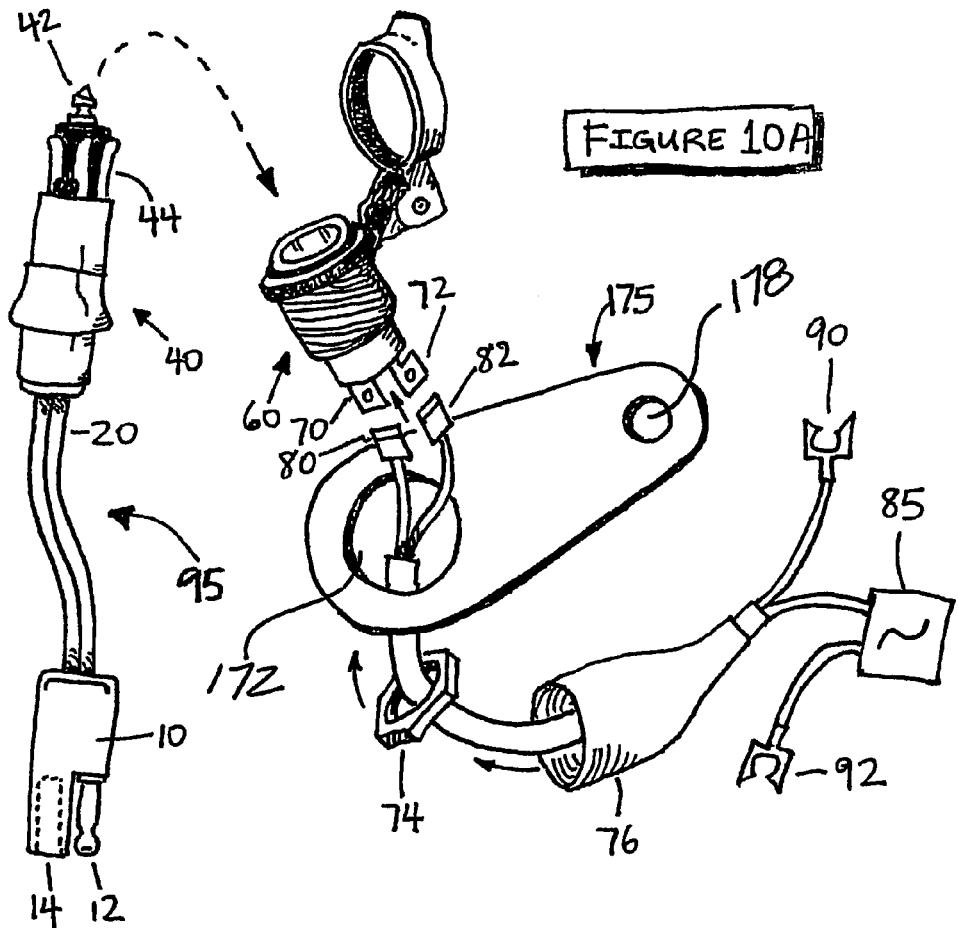
FIG. 10A shows another embodiment, especially made for Harley Davidson motorcycles, including wireless terminal connectors, a socket and a mounting bracket for advantageous placement on a Harley Davidson.

In accordance with the above-described objects and advantages sought by the present invention, there is disclosed a series of wiring harnesses with attached electrical connectors, convenient mounting brackets, convenient luggage carriers and various electrical adapters attached to one another either through a cable or wiring harness or by direct connection. As there are many things to describe, we shall begin with the simplest of the embodiments, which includes a wiring harness with a connector attached thereto. FIGS. 1 through 5 are adaptations on this disclosure and will be described in broad terms, although it must be understood that the various connectors, wire harnesses and terminal connections may be specifically made for specific applications and may be done so without any undue experimentation.

Mobile accessories have become very important in our society, and they all need to have power. The present invention provides sockets, connectors, wire and mounting brackets to enable us to plug in all these accessories and/or appliances. Although we are not limited to cell phones, stereo systems, digital cameras, video cameras, communication devices, as well as portable units as odd as coffee pots, oxygen generators, medical compressors, sleep apnea machines, among others, they all need to be plugged in so that their operators can go mobile. The present inventors envision that the sockets and connectors can be used on motorcycles, personal watercraft, off-road vehicles, wheelchairs, golf carts, hi-lo's, Segue's (a registered trademark of Dean Kamen and Segue Company), boats, cars, trucks, ATV's, snowmobiles, planes, gliders, parasails, or any other vehicle that has a power supply that can be tapped into for power.

Handicapped persons that require medical appliances could not go on a cross-country trip if they could not gerrymander an electrical power supply. Now, they can bring their appliance and easily plug it into an appropriate socket to tap into their vehicle's power supply. They can do this now without tearing apart their vehicle. Wheelchairs can now carry 12-volt appliances. Hi-lo operators can plug in their communications systems so they can hear voices in a noisy factory. This is the right invention at the right time.

In that vein, we look first to FIG. 1 which illustrates a wiring harness with an attached connector, generally denoted by the numeral 25, in which a two-pin SAE connector 10, including a male terminal 12 and a female terminal 14, is connected to a wiring harness 20. Although it is an option, switched ignition module 30 is shown in line with a switched ignition input one-quarter inch spade terminal 35 attached thereto for placement and securement within the off-road vehicle. Extending from the ignition module 30 is a wire terminating in a ground fork terminal 90. Another wire extending from ignition module 30 extends to an optional fuse holder 85 having a fuse therein. The fuse may be a replaceable fuse and environmental fuse holder, preferably an ATO or mini-ATO, in the range of from about 3 to about 20 amps, and most preferably includes a weatherproof fuse holder with an ATO 7.5 amp fuse installed therein. Yet another wire extends from the fuse holder 85 and terminates in a battery positive fork terminal 92.

The wiring harness 20 may be made of any suitable wire configuration, although it preferably is a single conductor PVC coated wire, or a two conductor zip cord, preferably in the range of 18 awg to about 12 awg with a preferred temperature rating of from 80 c to 125 c, and most preferably made of one black and one red wire, of a 16-guage, 105c, PVC covered wiring harness. Wiring harness 20 may also further include a second protective sheathing that also provides a bundling function, and is preferably wrapped in electrical tape or bound with PVC or another similar tubing, and is most preferably sheathed over with a 105c PVC tubing. Although the ground fork and battery positive fork terminals 90 and 92, respectively, are shown as one-quarter inch spade connectors, any suitable connector may be utilized, depending upon the application. In practicing the present invention, one would select whatever type of electrical termination connector would be best suited for the application at hand. Throughout the description of the present invention, there will be wires, such as cabling or wiring harnesses, used throughout and those wires may be any suitable wire and may be of any particular amperage which is suitable, although the preferred ranges and materials used are described hereinabove. The wires may be solid core, braided core, stranded wire, or any other suitable wire material.

At the end of wiring harness 20 are the terminals or connectors which are suitable for all the embodiments of the present invention, and they may include insulated or non-insulated terminals, and are optionally color-coded for easy polarity determinations, or they may be marked in any sort of fashion. In fact, all of the terminals and sockets may be color coded to closely correspond to the black and red color codes traditionally used in the electrical and electronics fields. It is especially preferable to mark the two-pin SAE connectors which are used throughout the present invention by using a red dot for the positive side, whether inscribed into the plastic on the positive terminal of the SAE connector, or a raised plus sign, or an indentation, possibly having some coloring in order for easy polarity determination. For instance, an off-road vehicle enthusiast may wish to plug in a heated vest in the darkness in order to get warm. If there were no lights around, the enthusiast may be able to feel for a raised plus sign, or for an indentation on the positive terminal, in order to be able to correctly plug in his vest without needing light to determine which was the positive and negative terminals. At the terminal end of the wire and connector, the terminals which are preferably used to connect the cable or wiring harness to the battery or other power source are preferably No. 8 to three-eighths of an inch ring or fork terminals, and most preferably are made of non-insulated quarter-inch fork terminals covered in red and black shrink tubing to provide insulation and color coding. It is well known in the electrical field that red is the color representing positive terminals, while black represents ground, or negative electrical current.

Furthermore, with respect to all of the embodiments, the wire harness may be fitted with a rubber boot to protect the connection on the back of the socket and improve the athstetics, whether the boot is straight or is applied at a right angle. The boot may also represent a wire guide system to direct the wire back into a position which is most desirable for use on the off-road vehicle.

Regarding the various socket configurations usable for any of the embodiments of the present invention, the power socket connector may be selected from the group of a DIN 4165 cable mount socket, a standard automotive cigarette cable mount socket, a two-pin SAE connector, an audio input or earphone jack plug, or any other standard socket.

Looking next to FIG. 2, there is shown a cable-mounted cigarette lighter socket attached to wire terminal connectors 90 and 92 through a fuse box 85. The cigarette lighter socket 50 is adapted to be received within clip 130 to hold the cigarette lighter socket in place wherever it is desired to be located. A rubber cap 128 may be configured such that a looped attachment to the cap can be slipped down over cigarette lighter 50 such that the rubber cap can be capped over the cigarette lighter socket to keep it clean and dry inside. Wiring harness 20 may be made in accordance with the wiring harnesses above. The cigarette lighter socket 50 is encircled by a rubber boot 52 which is integral with the wiring harness 20. The snap-in clip 130 for cigarette socket 50 includes mounting holes so that the socket can be secured anywhere it is desired, while the wiring harness carries the electrical terminators to the battery of the vehicle. Wiring harness 20 must be of a sufficient length so as to bring the cigarette lighter socket 50 into an easy to access location so that accessories may be plugged into the cigarette lighter.

FIG. 3 illustrates yet another embodiment of the present invention, including a cable-mounted DIN 4165 socket 55 attached to wiring harness 20 and also having electrical connections ground fork and battery positive fork terminals 90 and 92, respectively. Socket 55 is adapted to be received within the snap-in clip 135 for a cable mount DIN 4165 socket as disclosed in the present invention. An optional fuse holder and fuse 85 may advantageously be adapted into the wire connection from the battery.

Looking next to FIGS. 4 and 5, there is shown a DIN 4165 plug 40 having a positive post 42 and negative spring clips 44 integral therewith. The wiring harness 20 is comprised of two separate wires, each having an SAE two-pin connector 10 attached to the single DIN 4165 plugs 40. Each of the SAE connectors 10 includes a male terminal 12 and a female terminal 14. This configuration is usable in conjunction with the cable-mounted socket of FIG. 3. For instance, the spade terminal connectors 90 and 92 can be permanently attached to the battery of the off-road vehicle, and cable 20 can bring socket 55 into an easily accessible location on the outside of the off-road vehicle. Clip 135 will hold socket 55 in place while the DIN plug 40 of FIG. 4 can be plugged into the DIN 4165 socket 55 of FIG. 3. Then, the two SAE two-pin connectors 10 of FIG. 4 can be attached to other accessories such as two plug-in vests for a driver and a passenger. For other desirable accessory connections, FIG. 5 illustrates a similar adapter for taking the DIN 4165 plug 40 and connecting it via wiring harness 20 to a pair of DIN 4165 sockets 55. Needless to say, the adapters of FIGS. 4 and 5 can be interchanged with various connectors and plugs, depending upon the desired configuration which is needed for the situation at hand, and for the various appliances or accessories which need to be plugged in. If the accessory is of a European nature and has a DIN 4165 plug, then the configuration of FIG. 5 would be desirable. However, in the case of American accessories, such as plug-in vests and other off-road vehicle accessories, the adapter configuration of FIG. 4 would be most advantageous. Wiring harness 20 should be of a suitable length to easily access a battery terminal of an off-road vehicle in order to provide power to the accessories desired.

Referring now to FIG. 6, there is shown a DIN 4165 socket which is panel mounted onto panel 140 which can then be placed anywhere on the off-road vehicle. Panel 140 secures the socket 60 so that the desired accessories can be plugged in and unplugged with a great degree of certainty. As shown in FIG. 6, socket 60 is attached to a lid 62 and mounted to socket 60 with a spring 64. Socket 60 has positive and negative quarter-inch spade terminals 70 and 72, respectively, to be attached to positive and negative female quarter-inch spade connectors 80 and 82, respectively. Once the socket is in place and the spade connectors and terminals have been connected, then jam nut 74 is slid into place, holding socket 60 within panel 140. Wiring harness 20 extends therefrom and is encapsulated by rubber boot 76 and has ground fork and battery positive fork terminals 90 and 92 extending therefrom. On the battery positive side 92, an optional fuse holder and fuse 85 may be incorporated to prevent any overloads. Panel 140 may be a separate piece of material, or may be any panel which is already present on the off-road vehicle itself. Regardless of whether panel 140 is a separate piece which has to be attached to the vehicle, or if a hole can be placed within a sheet metal panel already existing on the off-road vehicle, socket 60 can be located for ease of use. Panel 140 may be incorporated into any component of the vehicle, including the sides, handlebars, the seats, back rests, or any other location on the vehicle.

In yet another embodiment, FIG. 7 shows a similar socket 60 which is mounted through a mounting bracket 142 which is especially designed to be used behind the passenger side foot peg rest 145 and is adapted to be attached to threaded holes 154 in a tale section subframe 150 for ease of access. The mounting bracket 142 is evened out with a washer 147 such that the rear set 145 is evened as it exits the motorcycle or other off-road vehicle. Existing bolts 152 are removed from the off-road vehicle, the mounting bracket is put into place, and then the rear set is secured over the mounting bracket before bolts 152 are reinserted into the vehicle. Mounting bracket 142 may be made of any suitable shape, although the shape of a rectangular area with a hole sized to receive the socket 60 is, of course, advantageous. Needless to say, mounting bracket 142 and washer 147 could be a single piece rather than the two pieces shown in FIG. 7. Furthermore, the mounting bracket 142 could be numerous numbers of pieces all connected together for advantageous electrical access.

FIG. 8 illustrates a unique socket adapted to be installed within the steering head or triple tree on a motorcycle. Socket 60 may include a cap 62 which is springably mounted thereon by spring 64. Extending downwardly from socket 60 are positive and negative electrical connectors 70 and 72, respectively, for being connected to the positive and negative connectors 80 and 82, respectively, which are attached to wires within wiring harness 75. The wires extending from the wiring harness 75 are terminated with connectors 90 and 92, and may further include a fuse holder 85 including a fuse, described hereinabove. Socket 60 is sized and adapted to be received within triple tree 160, or may also be located in optional mounting location 162 as shown in FIG. 8. Socket 60 is received within steering head tube 165, and brackets may be included around the circumference of socket 60 in order to mount the socket on top of the triple tree 160. If socket 60 is a cigarette lighter socket, most automotive appliances and accessories can be directly plugged into the socket. If, however, socket 60 is a DIN 4165 socket connector, and other appliances requiring the use of various connectors are utilized therewith, adapter 95 can be installed.

For example, in the case illustrated in FIG. 8, socket 60 is a DIN 4165 socket and is adapted to receive DIN 4165 plug 40 having a positive post 42 and negative spring clips 44. This DIN 4165 plug 60 is cable mounted via cord 20 to another connector, which in this case is a two-pin SAE connector 10 having a male terminal 12 and a female terminal 14. However, as with the rest of this invention, the SAE connector could be any type of connector desired in order to be able to plug in the appropriate accessory. The method of installation includes removal of the triple tree nut which is found on the steering bar on motorcycles, and replacement of that nut with socket 60 and any necessary brackets to size it to be utilized within that cavity. Steerhead tube 165 is hollow, allowing for the receipt of wires and wire connectors which will be hooked up to socket 60. Once socket 60 is secured within the steerhead tube 165, the wiring harness 75 can be tucked away in various other portions of the motorcycle and connected to the battery terminals in order to allow for power to be connected through the socket 60.

FIG. 9 shows another especially useful mounting bracket to be used with socket 60. Mounting bracket 142 has a hole therein for receiving socket 60, and socket 60 is secured in place against the mounting bracket 142 with a jam nut 74 and is then covered by boot 76. Mounting bracket 142 is held against an engine mount 190 with a bolt 192 and secured in place from behind with a nut 194. Mounting bracket 142 may be of any configuration, although it is preferably flat stock metal, or high durometer strength plastic components. For aesthetics, mounting bracket 142 is preferably a chromed piece of metal, preferably on the order of about one-eighth inch to one-quarter inch thick, and the hole contained therein is to be sized for receiving socket 60, whether socket 60 is a cigarette lighter socket or a DIN 4165 socket. Regardless of which socket is utilized, it is preferred to have a cap 62 which can be spring loaded over socket 60's opening by a spring 64, in order to keep out water, dust and dirt. Mounting bracket 142 is preferably made of this L-shape, although it may be an oval shape or any other suitable shape.

Figure 10B:
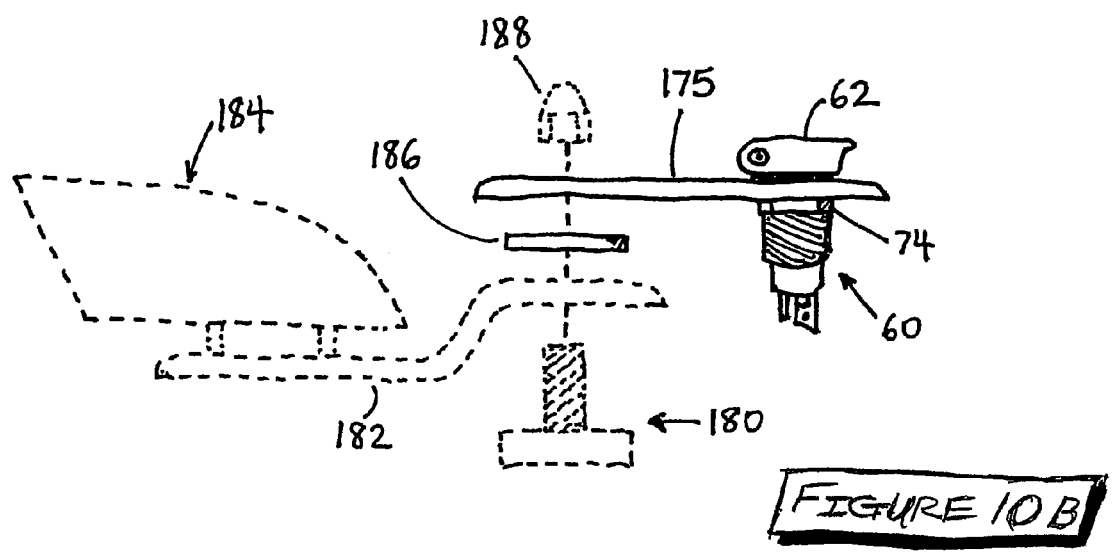
FIG. 10B shows a side elevation view of the same embodiment of FIG. 10A, including the placement of the mounting bracket with relation to the horn on a Harley Davidson.

FIGS. 10A and 10B illustrate one of the most useful embodiments of the present invention, incorporating socket 60 being held in place onto an elliptical mounting bracket 175. Elliptical mounting bracket 175 is particularly chosen to be mounted above the horn area, especially on Harley Davidson motorcycles. This allows for easy connection of accessories while the driver is operating the motorcycle. Elliptical mounting bracket 175 is preferably a chromed piece of metal, having a hole therein to receive either a DIN 4165 socket or a cigarette lighter socket, as well as a bolt hole opening at the other end of the elliptical mounting bracket 175. Hole 178 is sized to receive a standard bolt, as shown more clearly hereinbelow with reference to FIG. 10B. As above, once socket 60 is placed within socket hole 172, socket 60 is secured in place with jam nut 74. Again, a boot 76 keeps road debris, water and dust out of all of the electrical connections, and is terminated with positive and negative terminal connectors 90 and 92, respectively. FIG. 10A also shows an adapter to convert the DIN 4165 socket 60 to an SAE connection with SAE two-pin connector 10 attached via cable 20 to DIN 4165 plug 40.

FIG. 10B shows a side view of the mounting bracket and socket configuration of FIG. 10A when installed on a motorcycle having a horn 184. Horn 184 is attached to horn mounting bracket 182 on an existing motorcycle, especially Harley Davidson motorcycles. The original equipment includes a horn-mounting stud 180 and an existing horn mounting bracket 182 with an acorn nut 188 pulling them together. The method of installing the present invention at this location includes removal of acorn nut 188 and placement of a washer 186 and mounting bracket 175 over stud 180 and placing them in direct contact with the horn-mounting bracket 182 on the motorcycle. Thereafter, the acorn nut is merely reinstalled over the stud 180, and the electrical connections from socket 60 are woven back through the motorcycle components to the battery terminals of the motorcycle. This is the method for installing and then securing the wiring harness to the battery terminal such that cap 62 can be lifted and plug-in accessories can be directly put into the socket 60.

Further, as it would be advantageous to have a carrying case for all of the various accessories, and a place to plug them into, the carrying bag 240 of the present invention is shown in FIG. 11A and the connection is shown in FIG. 11B. Carrying bag 240 is most commonly referred to as a tank bag for motorcycles, and is secured to the motorcycle either via straps 242 or use of magnets which can also be utilized in place of straps 242, holding the tank bag directly to the motorcycle's gasoline tank. Tank bag 240 may be made of any suitable weather resistant material, including leather, nylon, or any other suitable luggage material, and may be big enough to carry all the accessories desired for a long trip, including cell phones, laptop computers, coffee pots, and the other desired appliances and accessories. Zippered pouches or compartments found in conventional luggage are envisioned for the tank bag of the present invention. In order to provide power to all of the accessories contained in tank bag 240, there is a tank bag power outlet flange 245 with a cap 247 that can be used to cover the connectors 252 and 254. Flange 245 is preferably waterproof or water resistant to prevent water from entering the bag. Although any other type of socket arrangement is possible, FIGS. 11A and 11B show the two-pin SAE connector possibility as SAE two-pin connectors are most commonly used for heated clothing or other accessories needed on top of the motorcycle. Needless to say, the tank bang may be used on any other vehicle which was listed above, including boats, wheelchairs, snowmobiles, construction equipment and the like.

Looking again to FIG. 11A, tank bag 240 may be sized ideally for receiving a laptop computer, and then the other accessories may be stacked on top of them. This way, cell phones, digital cameras and other electrical accessories can be recharging while the motorcycle is being run. SAE two-pin connector 10, having male plug 12 and female terminal 14, can be plugged into the outlet flange 245 and thereby be connected to another SAE connector which goes inside the tank bag for connection to any accessories which may be contained therein. External power cord/adapter 285 may be utilized in the event that a different type of power cord is to be used.

FIG. 11B shows a close-up view of the tank bag power outlet flange 245 and illustrates the relative placement of the SAE connector positive and negative terminals 242 and 254. A cap 262 is attached to outlet flange 245 via a living hinge 264, such that the cap is always available to provide protection against the outer elements. The attachment apertures 260 are holes through which a screw 282 can hold the flange against a secondary backing plate 275 which is to be located inside the tank bag, and held in place with a nut 280. Therefore, the outlet flange 245 is on the outside of the tank bag incorporating an electrical connector for ready access to the driver, while the backing plate 275 secures it within the tank bag side, and allows for a wire harness 20 to extend therein with a connector 10, shown as a two-pin SAE connector in this case. This configuration will generally yield a watertight configuration. However, it must be realized that any connector can be replaced with an SAE two-pin connector 10, depending upon the needs of the rider. And, of course, any adapter may be utilized in order to provide the driver with the appropriate appliance. Although the present invention envisions a one-piece tank bag with the outlet as part of the side of the case, it is also envisioned that existing tank bags and other pieces of luggage can be retrofitted by making a hole in the side of the bag, and inserting the outlet flange wire therethrough and will be secured by backing plate 275. It is specifically contemplated by the present invention that tank bag 240 could easily have molded therein an outlet flange to receive a connector or could have the connector directly molded into the tank bag itself.

Figure 12:
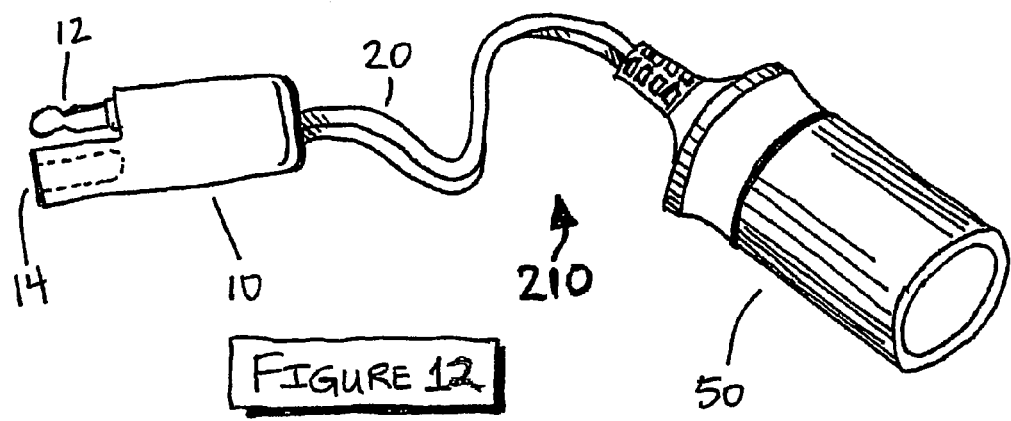
FIG. 12 is an adapter cord having an SAE connector at one end and a cigarette lighter socket at the other.
Figure 15:
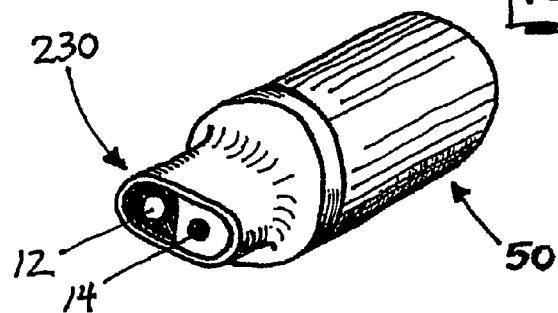
FIG. 15 is still another embodiment showing an integral component having an SAE connector at one end and a cigarette lighter socket at the other end.

Looking next to FIG. 12, there is shown an adapter 210 for converting an SAE two-pin connector 10 to a cigarette lighter socket 50, and they are attached by a cable 20. Alternatively, as shown in FIG. 15, there may be a direct connection between an SAE connector 230 and a cigarette lighter socket 50 without cable 20. In this configuration, all the wiring is made within the one piece component, so no external wire harnesses are necessary. In fact, for all the above and below adapters, it is plausible that the connectors can be molded into one piece as shown in FIG. 15, such that there is no cable necessary.

Figure 13:
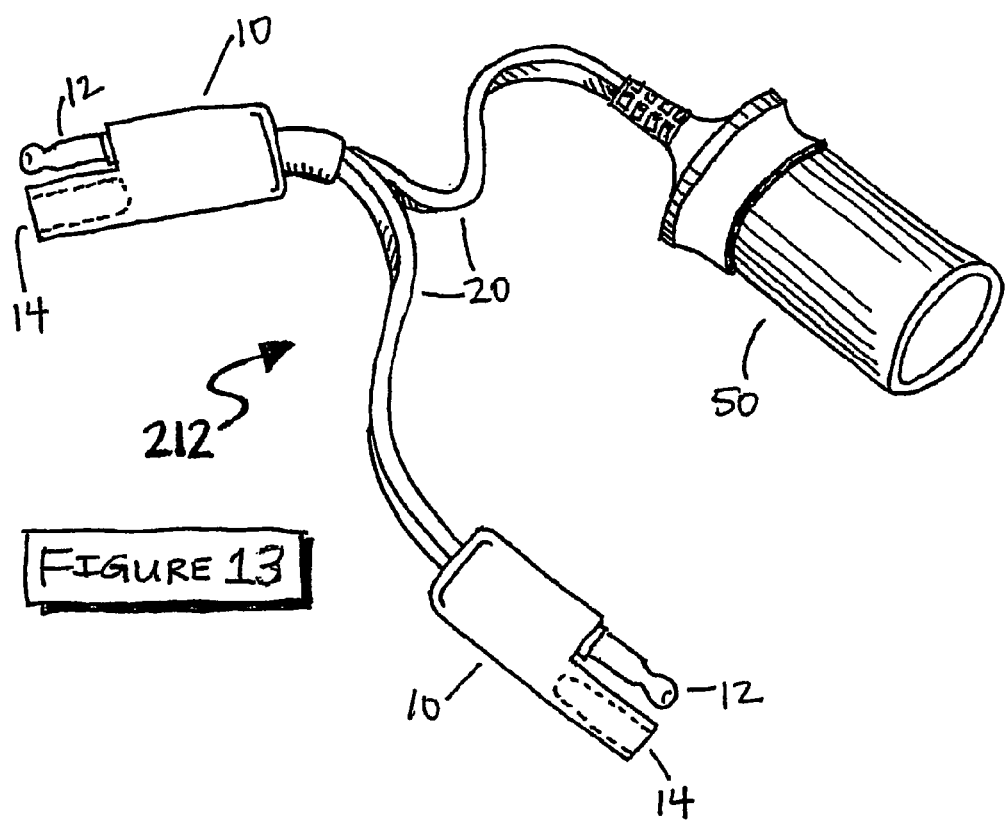
FIG. 13 is another embodiment wherein an SAE connector is connected through two cables to both a cigarette lighter socket and to another SAE connector.

Referring now to FIG. 13, there is shown an SAE connector adapter 212, in which the SAE two-pin connector 10 is hooked up to a cigarette lighter socket 50 and an SAE two-pin connector 10 via two cables 20. These cable-mounted systems may utilize all of the connectors described above, and may utilize any of the wiring configurations also described above with reference to FIGS. 1 though 5. As envisioned by the present inventors, any number of connectors can be joined to any other connector, including, but not limited to, SAE two-pin connectors cable mounted to at least one other connector, thereby adapting the electrical connection for various applications. As shown in FIG. 3, there are two cable-mounted adapters, although there may be three or more adapters ready to accept plugs from various accessories.

Figure 14:
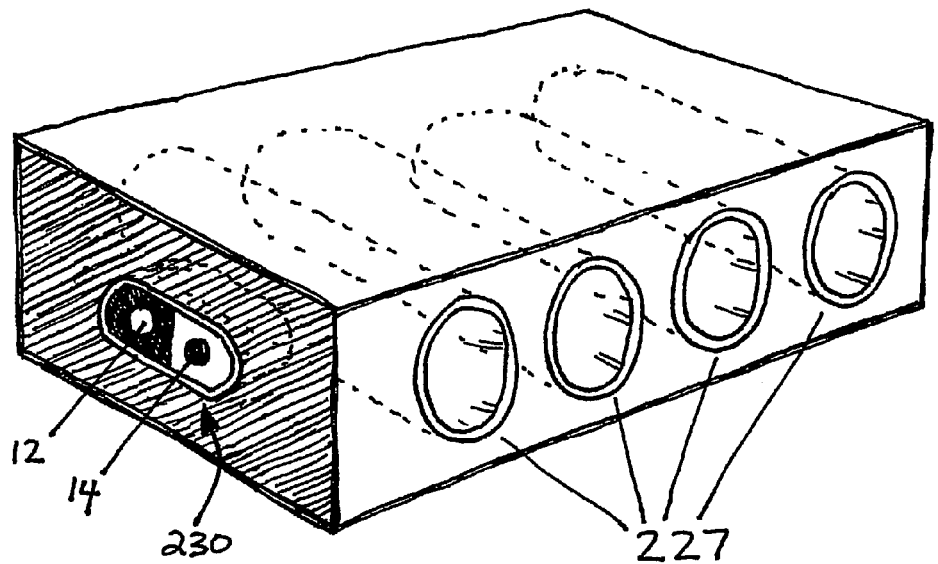
FIG. 14 shows a perspective view of a multiple cigarette lighter socket adapter to receive an SAE pin connector.

Looking now to FIG. 14, there is shown a cigarette socket power strip 225 which includes numerous cigarette sockets 227, shown here in the number of four, but may be of any number of connectors, with an SAE connector 230 having male and female terminals 12 and 14 extending from the side of the power strip 225. SAE connector 230 is wired to each of the cigarette sockets 227, thereby providing power to each of the sockets 227 when an electrical supply has been plugged into the SAE connector 230. Again, cigarette sockets 227 may also be at least one DIN 4165 socket(s), or any other type of connector which may be desirable.

FIG. 16 shows yet another embodiment of the present invention in which two SAE cable-mounted connectors 10 have a marked portion 232 on the positive terminal 12. In FIG. 16, the marking is shown as an indentation, but may be any marking. This identification of the positive terminal can make for quick and easy connections with an SAE connector, such that the polarities will never be reversed. This may be especially useful when one is trying to make an electrical connection in the dark, such as when you are trying to plug in a light, as described more fully hereinbelow. With the SAE two-pin connector 10, there is shown the male terminal 12 in addition to the female terminal 14. Marking 232 may be located at either the positive or the negative polarity of the cable mount SAE connector 10, so long as they are consistently marked. It is envisioned that only the positive terminal would be marked, so that persons would always know which end was positive. Marking 232 may also be made of a raised positive sign, or any raised design molded directly into the housing of the SAE connector 10. Furthermore, if marking 232 is painted with red paint, thereby indicating a positive terminal, it is visually much easier to determine which positive terminal should be plugged into.

FIG. 17A shows another embodiment of the present invention with two SAE connectors molded directly into a housing of a cigarette lighter socket 50. Again, cigarette lighter socket 50 may also be a DIN 4165 socket, or there may be several sockets contained in the body, with the multiple SAE connectors on the top. Notice the positive terminal indicator 232 so that a user is certain as to what the polarity is prior to his plugging in the device. FIG. 17B shows a top plan view of the device of FIG. 17A, and shows the molded symbols 232 for the positive polarity, in addition showing the cigarette socket positive contact 234 and the cigarette socket negative contact 236. The internal contact connections 238 are showed in phantom in order to indicate their relative placement. In the event of utilization of multiple cigarette lighter sockets 50, there would be multiple connectors attaching to the internal contact connections 238 for each of the sockets 50.

Looking now to FIG. 18, there is shown yet another embodiment of the present invention, a power distribution module generally denoted by the numeral 300 which includes at least one female socket connector 305 extending therefrom. The female socket connector 305 may be a standard socket readily available in the industry for receiving an audio headset plug male connector 310. It is common for the male connector 310 to have a right angle adapter 315, so that when the plug 310 is plugged into socket 305, the cord attached thereto does not extend outwardly, but rather at a right angle so that it is out of the way. Another feature of the power distribution module 300 may include a battery charge indicator 324, which can include red, yellow and green light indicators similar to a traffic light, such that the amount of charge left in the vehicle battery can easily be discerned by looking at the front panel of the power distribution module 300 and reviewing whether the red, yellow or green indicator light is turned on.

FIG. 18 also may include any number of other possible connectors, such as cigarette lighter socket 50, either singly or in combination with the female audio socket connectors 305. The female audio socket connectors 305 may also be connected to a noise filter circuit 320 and/or a DC stepdown converter 322. Both of the circuit 320 and the converter 322 are readily available at electronics stores, and have been installed here to provide a total package of electrical supply along with other desirable electronic features. Additional standard, readily available, electronic features may also be contained within the power distribution module 300 as they may be needed. The female socket connector 305 is standard in the audio electronics field, and when connected to the two-pin SAE connector 10 as shown in FIG. 18, will provide power to the audio device. In this particular embodiment, it is envisioned that the SAE connector 10 will be able to be plugged into the outlet flange of the tank bag configuration, or any of the other adapters disclosed hereinabove. If the power distribution module 300 is located within the tank bag, then various accessories such as a cell phone or digital camera can be recharged while the driver and passenger of the motorcycle can be listening to the stereo while they are driving down the road. Further, if the power distribution module 300 is installed on a personal watercraft or snowmobile, their cell phone can be recharging while they are listening to a radio as they are scooting across the lake or the snow.

Figure 19:
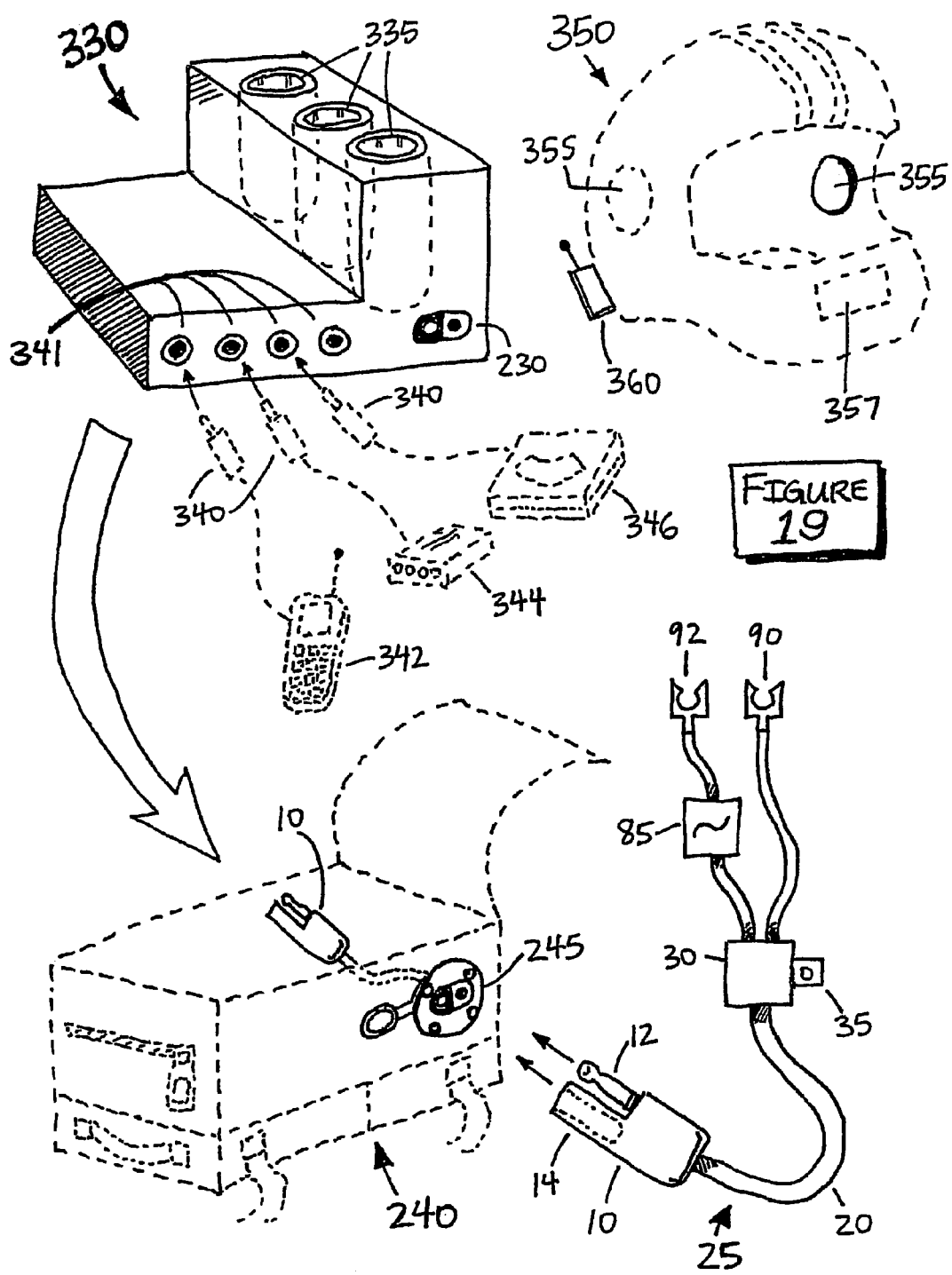
FIG. 19 illustrates the system of power distribution in accordance with the present invention.

FIG. 19 illustrates a combination of various embodiments possible for the present invention, showing the relative placement of a power distribution module 330 within a tank bag 240, and further connected to a helmet 350 having a commercially available battery-operated short range communicator incorporated therein. As wireless communications become more and more prevalent in the off-road vehicle market, means for plugging them in will become more important. Short range wireless communications are very beneficial to riders and passengers of these off-road vehicles because the driver and the passenger need to speak to each other, and while they are riding on the vehicle, it is nearly impossible to hear each other shouting over the wind rushing past them. For such a short range wireless communication, the present invention is especially useful. A power module 330 is shown having three (3) cigarette lighter sockets 335 and four (4) female audio input phone jacks, all connected to an SAE connector 230 in the side of the power module. Needless to say, there can be any combination of sockets and connectors that have been discussed above. Into the audio input jacks 341 are shown plugged in three (3) common accessories, i.e. a cell phone 342, a radar detector 344, and a personal audio player 346, possibly a CD player, MP3 player or cassette player. Other accessories or appliances are possible.

Still referring to FIG. 19, tank bag 240 is described hereinabove with reference to FIGS. 11A and 11B, as is the wire and connector combination 25, including a SAE connector 10 with wire 20 attached. In this embodiment, a switched ignition module 30 is useful because the switched ignition module will act to interrupt the signal being put out by the personal audio player 346 when either the driver or the passenger speak into their microphone 357, and so that the other person can hear the voice of the communicator through the audio headset 355 incorporated into the helmet 350. The power distribution module 330 can be placed into the tank bag 240 along with the accessories and all their cords. Ease of access and adjustment are possible as the driver of the vehicle needs only to lift up the top of the tank bag, and plug/unplug or adjust any of the enclosed accessories.

FIG. 20 illustrates the electrical schematic of one of the power distribution modules, and is generally designated numeral 96. Power module 96 may include a +12VDC in terminal 98, along with a +12VDC out terminal 99. A ground terminal 100 for accessories is in electrical communication with a vehicle chassis ground terminal 102 for proper contact. A series of fuse terminals 103 may be incorporated into the electronics for receipt of a plug-in fuse 104 to be connected to the main fuse or breaker 105. Relay or solid state switches 106 are connected to the fuses 104. A current sensor circuit 108 may also be included, and is in electrical communication with a relay 106 and a switched ignition input terminal 35, which may be made of a one-quarter inch spade terminal connector. An optional external control switch 109 may also be included, and may be connected via a control switch terminal 110.

FIG. 21 illustrates the electrical schematic diagram for a smart ground switch generally denoted by numeral 112, to be optionally used in conjunction with the other connectors of the present invention. Smart ground switch 112 includes a field effect transistor 113 and resistors 114 in conjunction with a ground wire input terminal 115. A switched ignition input terminal 35 may be used to connect the smart ground switch 112 to a female connector 120, preferably one-quarter inch spade connectors, respectively. An optional external control switch 109 may also be included between the female connector 120 and a female to male adapter 122, preferably a female/male one-quarter inch spade adapter, which is then connected to a male connector 121 from a halogen lamp 124. An existing headlight wire 126 is connected to a female connector 120 to be attached to the female/male adapter 122. The halogen lamp 124 may be used to illuminate anything the driver wants, and may be used in conjunction with the other embodiments of the present invention.

Figure 22A:
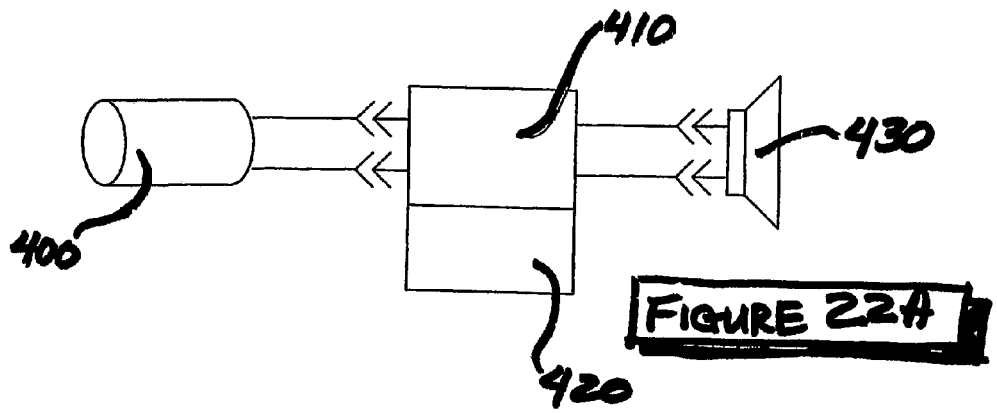
FIG. 22A illustrates the basic configuration of a horn activated garage door opener constructed in accordance with the present invention.
Figure 22B:
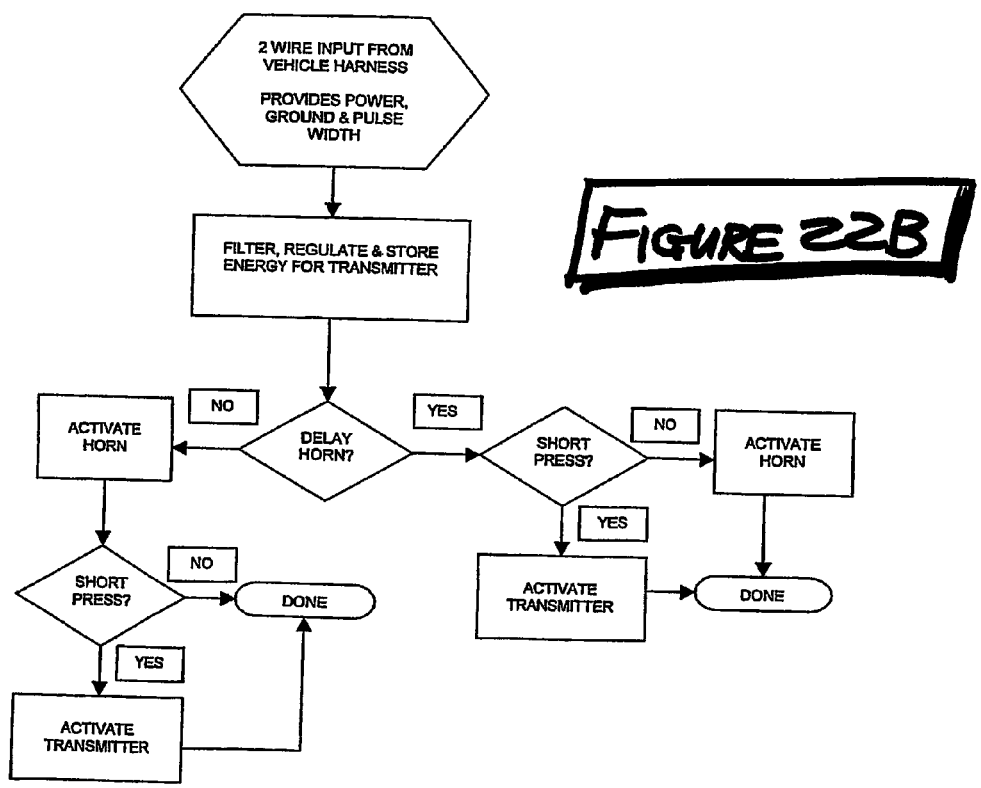
FIG. 22B shows a schematic diagram of the control circuit of the garage door opener of FIG. 22A.

FIG. 22A illustrates the final embodiment of the present invention which is a horn switch activated garage door opener for a vehicle rider to be able to activate his garage door opener transmitter without having to get off his vehicle and also without having to carry his garage door opener on his vehicle separately. The functional design of the control electronics is shown in FIG. 22B, and provides the multi-functional use of the originally equipped horn button of the vehicle with a function that will not only activate the originally provided horn, but will also activate an added-on garage door opener transmitter. FIG. 22A shows the original wire harness 400 attached to a control circuit 410, described more fully hereinbelow, and door opener transmitter 420, both of which are attached to the originally equipped horn 430 of the vehicle.

FIG. 22B illustrates the control circuit 410 in detail, and has a switch which may be used to select between various settings, including a first setting of "no horn delay" and a second setting of "horn delay". A knob may be included to adjust how much horn delay is desired. In the no-horn delay mode, the operator presses the horn button momentarily to activate the door opener circuit which stores enough energy to transmit the garage door opener. The horn will also sound. The operator would select this mode if instantaneous horn sound would be desired. However, on the other hand, if the horn delay mode is selected, incorporating a slight delay on the order of a several hundred milliseconds, then the garage door opening can be accomplished without sounding the horn. By pressing the horn button momentarily, this will only open the garage door. The operator can choose which option is best suited to his needs.

Therefore, the many embodiments of the present invention have been presented in enough detail to enable one of ordinary skill in the art to reproduce the invention without undue experimentation. The present invention achieves the above described objects and advantages being sought above, and solves new problems not yet encountered. Although the present invention has been described in terms of specific embodiments, the scope of the invention may not be so limited, as there are many adaptations and permutations which may become clear to one of ordinary skill in the art after reviewing all the above disclosed inventions. The present invention shall only be limited in scope by the appendant claims when taken in conjunction with the above description and the attached drawings.

INDUSTRIAL APPLICABILITY

The present invention finds industrial utility for providing easy to access power connectors on off-road vehicles in order to be able to plug in various accessories which are commonly used by the public when utilizing off-road vehicles. The present invention finds particular utility with regards to motorcycles, but may be used in any other application.

What is claimed is:

1. A vehicle tank bag for carrying and electrically connecting vehicle accessories with plug-in jacks, comprising:
   a tank bag adapted for securing to a desired vehicle, said tank bag including a compartment for holding vehicle accessories and other articles;
   a mounting bracket to be secured through the tank bag, said mounting bracket being adapted to receive and secure at least one power output connector in a location on the tank bag for easy access of plugging in a jack from a vehicle accessory;
   at least one power input connector located within the compartment of the tank bag, said connector being selected from the group consisting of a SAE two-pin connector, a cigarette lighter socket, a DIN 4165 connector, or combinations thereof;
   a wiring harness connected to the power input connector;
   at least one battery terminal connector for electrically connecting a vehicle battery to the tank bag and the power input connector contained therein; and at least one power output connector for receiving the plug-in jacks of the desired vehicle accessories, said power output connector being selected from the group consisting of cigarette lighter sockets, DIN 4165 sockets, audio input sockets, and two pin SAE connectors; such that the tank bag can be secured to the vehicle, and electrical connections may be made through the tank bag to various vehicle accessories without having to disassemble any or all of the vehicle to get to its battery to power the accessory.

2. The tank bag of claim 1, wherein the tank bag may be a cloth tank bag with an upper compartment.

3. The tank bag of claim 1, wherein the tank bag further includes a wireless communication module within the tank bag for wireless communications between the driver and others, including passengers and remote parties.

4. The tank bag of claim 1, wherein the tank bag further comprises an automatic audio switch connected to a headphone music system to switch between music and other audio signals including speech and announcements that may be needed.

* * * * *